Oct. 4, 1949.     G. S. BURROUGHS     2,483,399
RADIO DIRECTION FINDER
Filed April 9, 1946

INVENTOR.
GORDON S. BURROUGHS

BY

R. P. Morris
ATTORNEY

Patented Oct. 4, 1949

2,483,399

UNITED STATES PATENT OFFICE 2,483,399

RADIO DIRECTION FINDER

Gordon S. Burroughs, Forest Hills, N. Y., assignor to Federal Telecommunication Laboratories, Inc., New York, N. Y., a corporation of Delaware Application April 9, 1946, Serial No. 660,613

5 Claims. (Cl. 343—118)

My invention relates to phase comparison system, and more particularly one for use in radio direction finders.

It is known that the cathode ray tube can be used in various circuit connections to indicate instantaneously phase relationships between voltages and currents by a more or less sharp trace line on the screen, which by its angular position respecting a reference point indicates a phase displacement. This angular indication however, will not be accurate unless certain very exacting requirements respecting balancing factors such as phase and amplitude of the respective voltages applied to the deflector circuits, be complied with. A further disadvantage of these known devices arises from the fact that inaccuracies due to the aforesaid causes will occur unnoticed. These disadvantages become of considerable importance when a phase indicator of the type mentioned is used in connection with direct-reading direction finders.

It is an object of my invention to provide a phase comparison indicating arrangement wherein an existing phase displacement between two voltages is accurately indicated notwithstanding variation in the transmission characteristics of the translating means between the voltages concerned and the indicator.

Another object of my invention is to provide a phase comparison system utilizing a cathode ray tube as the phase indicator and wherein the screen trace substantially accurately indicates phase angle even though the trace shape may undergo a change.

A further object of my invention is to provide a radio direction finder, utilizing a phase comparison of the type above indicated in which one of the voltages is produced by the effective rotation of a directive radiation pattern, as for example, through a goniometer, and the other voltage is a reference voltage produced in synchronism with the goniometer operation.

A still further object of my invention is to provide a radio direction finder in which goniometer action produces two voltages whose displacement in phase varies with the angular change in the directive radiation pattern together with means for translating this displacement into substantially linear indication on a cathode ray tube screen.

Still another object of my invention is to provide a direction finder of the type indicated in the last preceding paragraph in which derivations of both the voltages are applied to both of the deflector circuits in such a manner that the screen trace accurately indicates the phase angle whether it be linear or elliptical in shape.

Figure 1:
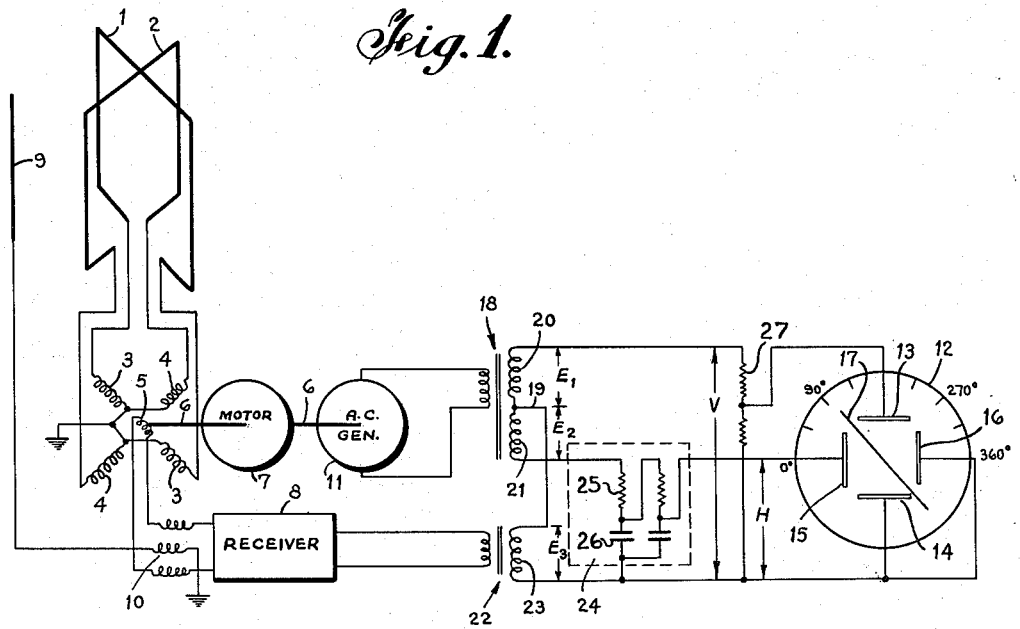
Figure 2:
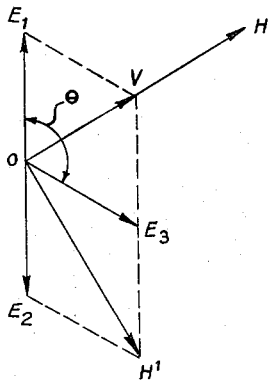

The foregoing and other features and objects of my invention will become more apparent and the invention itself best understood from the following description of the preferred embodiment thereof taken with the accompanying drawing in which, Fig. 1 shows a circuit diagram of my novel direction finder, and Fig. 2 is a vector diagram of the principal voltages in the circuits of Fig. 1.

The particular directional antenna chosen for illustration comprises two right-angle loops 1 and 2 connected, respectively, to the two pairs of primary windings 3 and 4 of a conventional goniometer. The secondary pick-up coil 5, carried on the shaft 6 of the motor 7, is rotatably mounted in inductive relation with the primary windings so that as the pick-up coil rotates, the coil terminal voltage varies in the same manner as would the terminal voltage of a rotating loop in the same field. A single rotating loop may if desired be substituted for the goniometer and crossed loops. The directional antenna is connected to the input of a receiver 8 containing the usual detecting circuits which will deliver to the receiver output a direct current voltage proportional to the applied antenna voltage. The receiver output will vary cyclically at the speed of the motor driven coil when a radio wave is received by the antenna, and the time phase of the cyclic variations will change as the azimuthal direction of the received wave changes. To remove the ambiguity of the two 180 degree indications at the terminals of the rotating goniometer, caused by the cardioid pattern of the loops, the usual omni-directional vertical antenna 9 is inductively coupled at 10 to the two legs of the loop circuit.

According to an important feature of my invention, an alternating current generator or alternator 11 is driven by the motor, the frequency of the alternating output voltage being equal to the periodicity of the receiver output. With a two-pole alternator, direct shaft coupling to the alternator and to the goniometer pick-up coil will give the necessary matched frequencies.

The relative time phases of the generated alternating voltage and the receiver output voltage are determined by the direction of the received wave, and according to another feature of my invention, novel means are provided for comparing and visually indicating the phase of these voltages in terms of direction.

The cathode ray tube 12 is preferred as the indicating device, the pairs of deflection plates 13, 14 and 15, 16 being so coupled to the voltages to be compared that a straight light line 17, as shown diagonally across the screen, will pivot about the center point of the screen in response to changes in direction of the received radio wave. A scale of 360 degrees may be laid out about the periphery of the screen. For convenience of description, plates 13 and 14 will be arbitrarily referred to as vertical deflection plates, and plates 15 and 16 will be called horizontal deflection plates. Magnetic beam deflectors could be substituted.

The alternator voltage is applied to a transformer 18, the secondary winding of which is tapped at its center 19, thus providing two windings 20 and 21 with phase opposed voltages, and the receiver output voltage is applied to a transformer 22, of which the secondary winding 23 is connected at one end to said center tap 19. Windings 20 and 23 are thus connected in series and to the vertical deflection plates 13 and 14, while windings 21 and 23 are connected in series and to the horizontal deflection plates 15 and 16. In the latter connection, a phase shifter 24 is included. The particular phase shifter shown is adjustable over a 0-to-180 degree range and comprises resistor 25 and capacitor 26, the relative values of which are selected to give a 90 degree shift. Fine adjustment of the shifter may be obtained by an additional resistance and condenser in parallel thereto. In order to compensate the attenuating effect of the phase shifter an attenuator 27 is used in the vertical deflecting circuit.

The operation of the coupling circuits of Fig. 1 may best be considered with a vector diagram of the important voltages, such as shown in Fig. 2. Assume that the pick-up coil 5 and the rotor of the alternator 11 are so oriented on the motor shaft that the alternator voltage and the receiver output voltage are in phase when a received signal arrives from due north. Then if a radio wave is received at an angle $\theta$ with the north-south meridian, the phase angle of the receiver output voltage $E_3$ with respect to the alternator voltage $E_1$ will be $\theta$. Voltages $E_1$ and $E_2$, of the two halves of the divided winding are, of course, 180 degrees out of phase. The vectorial sum of $OE_1$ and $OE_3$ shown in Fig. 2, is voltage $OV$ which is applied across the vertical deflection plates 13 and 14. The vectorial sum of $OE_3$ and $OE_2$ is voltage $OH'$ which upon being shifted 90 degrees by the phase shifter 24 to position $OH$ is applied to the horizontal deflection plates 15 and 16.

Since voltage $OV$ on the vertical deflection plates is in phase with voltage $OH$ on the horizontal deflection plates, a straight line on the screen can be produced, the angle of the line being a function of the angle $\theta$ which the voltage $OE_3$ makes with voltage $OE_1$ and $OE_2$.

Additionally, it is possible to view the operation analogously to that in patent to Busignies et al., 2,263,377, Nov. 18, 1941, where two oppositely rotating vectors under given conditions may effect a linear phase indication on a cathode ray oscillograph screen. In the instant case the generator and receiver voltage vectors existing in the circuits described produce such an effect, and it will be linear under conditions described including equality of amplitude. If amplitudes are different the locus of resultant points will be on an ellipse, whose major axis corresponds to linear indication for equal amplitudes.

A straight line on the screen requires that $E_3$ equal $E_1$ or $E_2$, a condition which can be approximated with manual gain controls and automatic volume controls in the receiver. If these two voltages should become unequal, the line on the screen becomes an elongated ellipse, but with the major axis still pointing in the proper direction, and the observer is correctly apprised of the facts such as unequality of voltages. Hence, for a given wave received by the antenna, the frequency and phase of the voltages to be compared are fixed by the keyed connections of the pick-up coil 5 and alternator 11 to the motor shaft and any amplitude variations are clearly shown on the screen and are rendered harmless. All misleading information is thus effectively eliminated from the screen of my novel direction indicator.

My improved direction finder is mechanically simple, easy to operate, and most important, is reliable.

While I have described in some detail an embodiment of my invention, it is to be understood that this is only by way of explanation and not limitation and that various changes are possible without departing from the spirit and scope of my invention.

I claim:

1. A radio direction finder comprising a first source of alternating voltage, a second source producing a single phase alternating voltage, the phase relation of the voltages of the two mentioned sources being variable in response to varying directions of a received radio wave; means for comparing and visually indicating said phase relation comprising a cathode ray tube with right-angle beam deflectors, means to combine said first and second voltages to obtain separate vector sum and difference voltage components thereof, connections to apply one component to one beam deflector, a 90 degree phase shifter, and connections to apply the other component through said phase shifter to the remaining beam deflector.

2. A radio direction finder comprising two alternating voltage sources, a transformer with a center-tapped secondary winding, one alternating voltage source coupled across said winding, connections for applying the other alternating voltage to the center tap of said secondary winding to obtain separate vector sum and difference voltage components of said two voltages, a phase shifter for shifting the phase of one of said components, and means for comparing the other component with the phase shifted component.

3. A radio direction finder comprising an antenna having an asymmetrical direction pattern, a motor, means driven by said motor for deriving a voltage cyclically variable at the speed of said motor and in phase with the signal strength at the terminals of said antenna corresponding to a continuously varying direction about said antenna, an alternating current generator connected to said motor, and means comparing the phase of the cyclically variable voltage with the phase of the alternating output of said generator comprising means for combining said variable voltage with the output of said generator to obtain separate vector sum and difference voltage components thereof, means for shifting the phase of one of said components and means for comparing said other component with said phase shifted component.

4. A direction finder comprising a cathode ray tube having two right-angle beam deflectors, two transformers, the secondary winding of one of said transformers having end terminals and a tap terminal connected to the center of said winding, the secondary winding of the other transformer being connected between the mentioned tap terminal and a common terminal for said two right-angle beam deflectors, the remaining terminals of said two deflectors being connected, respectively, to said end terminals and means for shifting 90 electrical degrees the voltage applied to one of said remaining terminals.

5. In direction finders, a radio goniometer, an alternator, a motor mechanically coupled to said goniometer and to said alternator, and a radio receiver electrically coupled to said goniometer; a cathode ray tube having two pairs of beam deflection plates, a first and a second transformer winding, coupled, respectively, to said alternator and to the output of said radio receiver, said first winding having a center tap, a phase shifting device, two contiguous deflection plates of the tube being connected together and to one terminal of said second winding the other terminal being connected to said center tap, the remaining deflection plates being connected, respectively, to the end terminals of said first winding, said phase shifter being connected in circuit with one of the last mentioned connections.

GORDON S. BURROUGHS.

REFERENCES CITED

The following references are of record in the file of this patent:

UNITED STATES PATENTS

| Number | Name | Date |
| --- | --- | --- |
| 2,166,991 | Guanella | July 25, 1939 |
| 2,223,840 | Wolff | Dec. 3, 1940 |
| 2,281,995 | Purington | May 5, 1942 |
| 2,314,851 | Barney et al. | Mar. 23, 1943 |
| 2,328,985 | Luck | Sept. 7, 1943 |
| 2,374,817 | Hardy | May 1, 1945 |
| 2,388,262 | Ganiayre | Nov. 6, 1945 |
| 2,406,800 | Busignies | Sept. 3, 1946 |
| 2,408,039 | Busignies | Sept. 24, 1946 |
| 2,408,120 | Wirkler | Sept. 24, 1946 |